3,179,675
PURIFICATION AND STABILIZATION OF
QUINGESTRONE
Freeman H. McMillan, Dover, and Fred C. Ninger, Livingston, N.J., assignors to Warner-Lambert Pharmaceutical Company, Morris Plains, N.J., a corporation of Delaware
No Drawing. Filed June 18, 1963, Ser. No. 288,624
2 Claims. (Cl. 260—397.4)

This invention relates to a process for the purification and stabilization of certain steroid compounds and relates more particularly to a novel process for the purification and stabilization of quingestrone, 3-(cyclopentyloxy)pregna-3,5-dien-20-one having the structural formula:

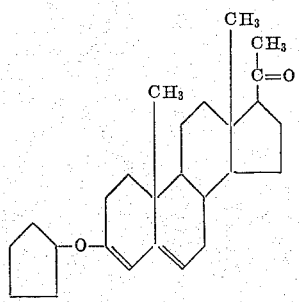

Quingestrone is a novel, orally active sex-hormone which exhibits progesterone-like activity and occurs as a white crystalline product soluble in most organic solvents. Generally, the level of therapeutic activity of said compound can be preserved for extended periods if the compound is maintained at low temperatures, but at room temperature, for example, the therapeutic activity is found to decrease gradually. Thus, when maintained at 20° to 25° C. for about 150 days; 25% of the initial therapeutic activity is lost. In order to stabilize the therapeutic activity of quingestrone, a number of expedients have been proposed, including the incorporation of quingestrone in solvent systems, such as fats or oils. While the stability and hence the therapeutic activity of the quingestrone in such systems is somewhat extended, some degradation and loss of activity of the quingestrone still does occur.

Accordingly, a primary object of this invention is to provide means whereby the stability of the compound 3-(cyclopentyloxy)pregna-3,5-dien-20-one, i.e., quingestrone, at room temperature may be enhanced.

Another object of this invention is to provide a new and novel process for the purification of quingestrone by removal of impurities.

It has now been found that the desired stabilization and purification of quingestrone may be accomplished conveniently by crystallizing quingestrone from solution in an alcohol, such as methanol, or from acetone, or from a mixture of methanol and acetone, in the presence of a small amount of pyridine and a stabilizer such as α-tocopherol. The quingestrone to be purified is preferably first dissolved with gentle heating in an excess of the selected solvent containing the desired amount of pyridine and α-tocopherol and, after cooling, the purified crystals which precipitate are readily recovered from the mother liquor by filtration. It has also been found to be advantageous to wash the freshly recrystallized quingestrone with some fresh solvent containing a small amount of pyridine and α-tocopherol. The washed crystals are then preferably dried under a vacuum at about 20 to 25° C. Although alcohol or acetone alone is a satisfactory solvent for the process of this invention, it has been found that the mixture of one part methanol with about 2.25 parts of acetone is particularly advantageous. While α-tocopherol is the preferred stabilizer, others, such as citric acid or p-(t-butyl)-phenol are also quite effective. The solvent employed in the recrystallization and purification step preferably contains from about 0.05 to 0.2% by weight of pyridine and about 0.05 to 0.2% by weight of the selected stabilizer. The purified quingestrone thus obtained has been found to be of a high order of stability and no decomposition or decrease in therapeutic activities is detected even after storage at a temperature of about 20° to 25° C. for a period of 150 days. Thus, the process of this invention as described above makes it possible now to store quingestrone for an extended period of time without any adverse effect upon the activity-stability thereof.

The following examples are included in order further to illustrate this invention. All temperatures are given on the centigrade scale.

EXAMPLE 1

2503 g. of quingestrone melting at 91° to 98° are dissolved with gentle heating in 3920 ml. of hot acetone containing 17.78 ml. of pyridine and 17.78 g. of α-tocopherol. This solution is filtered hot and diluted hot with 2400 ml. acetone plus 12,700 ml. of methanol so that all is at the boiling point at the end. The total volume of the solvents used is about 19 liters and the 17.78 ml. of pyridine and 17.78 g. of α-tocopherol added represent about 0.1% respectively. This solution is then chilled at 5° overnight (about 12 to 16 hours) and then held for 3 or 4 hours more at 0–2°. The crystals which separate are filtered and washed with 1000 ml. of methanol containing 1 ml. of pyridine and 1 g. of α-tocopherol. The crystalline material is then dried under vacuum at room temperature. The purified quingestrone obtained weighs 2180 g. (87% recovery) and melts at 111–112°.

EXAMPLE 2

About 10 grams of stabilized quingestrone obtained in accordance with Example 1 are stored at 20 to 25° for 5 months. About 10 grams of untreated quingestrone are also stored at 20 to 25° for 5 months. The following table illustrates the stability test data obtained upon assay of the respective stabilized and of the untreated compound.

*Stability data*

| | Initial assay, percent | 5-Month assay, percent |
|---|---|---|
| Stabilized quingestrone | 99.5 | 99.5 |
| Untreated quingestrone | 90.5 | 74.5 |

Briefly, quingestrone is assayed in accordance with the following chromatographic procedure: 250 lambda of a 5% solution of quingestrone in heptane is streaked onto a 3" by 18" strip of Whatman No. 3 filter paper. The streaked paper is then placed in a chromatographic cylinder containing a solvent of 6 parts of n-heptane and 1 part of methyl Cellosolve and the solvent is allowed to reach the end of the paper. The paper chromatogram after drying is examined on a viewing apparatus, such as the one described in U.S.P. XVI, page 923 without the phosphor plate. Quingestrone can be seen as a dark zone which is cut off and extracted with 10 ml. of 0.1% w./v. solution of isonicotinic acid hydrazide in acidic methanol. The absorbence of an optically clear solution of the eluate is determined at a wave length of 415 mµ. The percentage of quingestrone present can be readily calculated by comparing with the optical absorbence of a standard quingestrone solution.

It is to be understood that the foregoing detailed description is given merely by way of illustration and that many variations may be made therein without departing from the spirit of our invention.

Having described our invention, what we desire to secure by Letters Patent is:

1. Process for the stabilization of a compound of the formula:

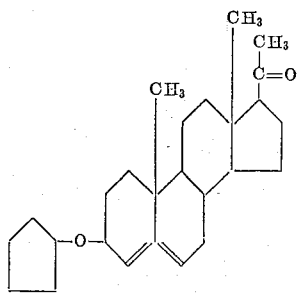

which comprises crystallizing a solution of said compound from a solvent system of the group consisting of methanol, acetone and a mixture of methanol and acetone, said system containing about 0.05 to 0.2% by weight of pyridine and about 0.05 to 0.2% by weight of a member of the group consisting of α-tocopherol, citric acid, and p-(t-butyl)-phenol.

2. Process for the stabilization of a compound of the formula:

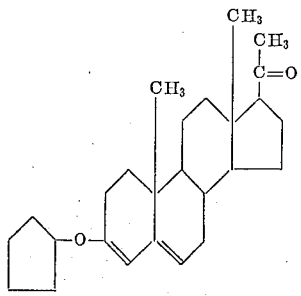

which comprises dissolving about 1 part of said compound in 5.5 parts of a solvent mixture consisting of about 2.5 parts of methanol, 1 part of acetone, 0.005 parts of pyridine and 0.005 parts of α-tocopherol, recrystallizing said compound from the solvent mixture and recovering the crystalline product therefrom.

References Cited by the Examiner

UNITED STATES PATENTS

| | | | |
|---|---|---|---|
| 2,262,428 | 11/41 | Lietz | 252—153 |
| 2,469,284 | 5/49 | White | 252—153 |
| 3,084,174 | 4/63 | Patchett et al. | 260—397.4 |

OTHER REFERENCES

Rosenwald et al.: "Industrial and Engineering Chemistry," January 1950, vol. 42, pages 162–165.

"The Merck Index," 1960, 7th Edition, page 1050, Merck and Co. Inc., Rahway, New Jersey.

LEWIS GOTTS, *Primary Examiner.*